(12) United States Patent
Foltz et al.

(10) Patent No.: US 8,418,858 B2
(45) Date of Patent: Apr. 16, 2013

(54) MERCHANDISE HANGER AND METHOD OF USE

(75) Inventors: Peter M. Foltz, Minneapolis, MN (US); Timothy M. Liu, St. Paul, MN (US); Jake Strassburger, South Plainfield, NJ (US); Alex Tetiyevsky, Springfield, NJ (US); Keith C. Cedro, Clifton, NJ (US)

(73) Assignee: Target Brands, Inc., Minneapolis, MN (US)

( * ) Notice: Subject to any disclaimer, the term of this patent is extended or adjusted under 35 U.S.C. 154(b) by 192 days.

(21) Appl. No.: 12/884,008

(22) Filed: Sep. 16, 2010

(65) Prior Publication Data

US 2011/0068067 A1     Mar. 24, 2011

Related U.S. Application Data

(60) Provisional application No. 61/243,666, filed on Sep. 18, 2009.

(51) Int. Cl.
  *A47F 5/08*      (2006.01)
  *A47F 7/16*      (2006.01)

(52) U.S. Cl.
  USPC ............................................. 211/45; 211/113

(58) Field of Classification Search ............ 211/45, 211/34, 113, 118, 87.01, 60.1, 70.6; 223/85–92; D6/315–328; 248/95, 317, 307; 206/806, 206/278, 348; 40/322, 661.06, 653
  See application file for complete search history.

(56) References Cited

U.S. PATENT DOCUMENTS

| | | |
|---|---|---|
| 1,914,951 A | 6/1933 | Kiessling |
| 2,317,204 A | 4/1943 | Lowenthal |
| 3,123,331 A | 3/1964 | Field et al. |
| 3,435,999 A | 4/1969 | Mantell |
| 3,501,124 A | 3/1970 | Goss |
| 3,710,996 A | 1/1973 | Smilow et al. |
| 3,755,859 A * | 9/1973 | Solari .............................. 223/87 |
| 3,851,790 A | 12/1974 | Kasper |
| 4,632,242 A | 12/1986 | Choi et al. |
| 4,832,301 A | 5/1989 | Hiramoto et al. |
| 4,889,265 A | 12/1989 | Morgan |
| 4,932,571 A | 6/1990 | Blanchard |
| 5,222,638 A * | 6/1993 | Kolton et al. ................... 223/87 |
| 5,328,137 A | 7/1994 | Miller et al. |
| 5,429,284 A * | 7/1995 | Kolton et al. ................... 223/85 |
| 5,509,528 A | 4/1996 | Weisburn |
| 5,520,311 A | 5/1996 | Lam |
| 5,556,014 A | 9/1996 | Kolton et al. |
| 5,582,387 A | 12/1996 | Kolton et al. |
| 5,615,810 A | 4/1997 | Kolton et al. |

(Continued)

*Primary Examiner* — Jennifer E. Novosad
(74) *Attorney, Agent, or Firm* — Griffiths & Seaton PLLC

(57) ABSTRACT

A merchandise hanger includes a base section, a living hinge, and a hooked section. The base section defines a front surface and a rear surface opposite the front surface and includes features configured to facilitate coupling the base section to the product assembly. The living hinge extends from the base section. The hooked section extends from the living hinge. The base section includes one of at least one male coupling structure and at least one female coupling structure. The hooked section includes the other of the at least one male coupling structure and the at least one female coupling structure. The merchandise hanger folds about the living hinge in a manner mating the at least one male coupling structure and the at least one female coupling structure to maintain the merchandise hanger in a folded position. Other hangers, products, assemblies and associated methods are also disclosed.

14 Claims, 10 Drawing Sheets

U.S. PATENT DOCUMENTS

| | | | |
|---|---|---|---|
| 5,620,118 A * | 4/1997 | Kolton et al. | 223/85 |
| 5,799,843 A * | 9/1998 | Hsu | 223/85 |
| 5,906,349 A | 5/1999 | Roy | |
| 5,957,344 A * | 9/1999 | Kolton | 223/85 |
| 5,988,381 A * | 11/1999 | Ling | 206/349 |
| 6,094,848 A * | 8/2000 | Heath et al. | 40/322 |
| 6,102,461 A | 8/2000 | Rooney et al. | |
| 6,206,253 B1 * | 3/2001 | Kolton et al. | 223/85 |
| 6,446,932 B1 | 9/2002 | Butterfield et al. | |
| 6,497,347 B1 * | 12/2002 | Feibelman et al. | 223/87 |
| 6,609,693 B2 | 8/2003 | Hui | |
| 6,769,541 B1 | 8/2004 | Carriere | |
| 7,040,582 B2 | 5/2006 | Rosler | |
| 7,128,222 B2 | 10/2006 | Doucette | |
| 8,136,209 B1 * | 3/2012 | Willison | 16/430 |
| D657,577 S * | 4/2012 | Coote et al. | D6/328 |

* cited by examiner

MERCHANDISE HANGER AND METHOD OF USE

CROSS-REFERENCE TO RELATED APPLICATIONS

This non-provisional application claims the benefit under 35 U.S.C. §119(e) to U.S. Provisional Application No. 61/243,666, filed Sep. 18, 2009, which is incorporated herein in its entirety.

BACKGROUND OF THE INVENTION

Picture frames (oftentimes including pictures), pictures, artwork, and similar products are generally packaged and transported in cardboard packaging, which allow viewing of the products while at the same time protecting the edges and corners of the products from damage. Whether or not such products are wrapped in cardboard packing, the size and weight of such products has created difficulties in effectively displaying these products in a retail setting. The products are often stacked on the floor or placed on a shelf for viewing by potential consumers.

In other instances, the products are hung from retail supports to be viewed by potential consumers. When the products are hung, hangers or other mechanisms facilitating such hanging often protrude from the edges of the products. These protrusions create awkwardly sized products to pack and ship, which, in turn, increases expenses generally associated with packing and shipping the associated products.

SUMMARY

One aspect of the present invention relates to a merchandise hanger for displaying a product assembly. The merchandise hanger includes a base section, a living hinge, and a hooked section. The base section defines a top edge, a bottom edge opposite the top edge, a front surface, and a rear surface opposite the front surface. The base section includes features configured to facilitate coupling the base section to a back of the product assembly such that the front surface of the base section abuts the back of the product assembly. The living hinge extends from the bottom edge of the base section. The hooked section extends from the living hinge in a direction opposite the base section. The base section includes one of at least one male coupling structure and at least one female coupling structure. The hooked section includes the other of the at least one male coupling structure and the at least one female coupling structure. The merchandise hanger is configured to fold about the living hinge in a manner mating the at least one male coupling structure and the at least one female coupling structure to maintain the merchandise hanger in a folded position. Other related products, retail display assemblies, and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
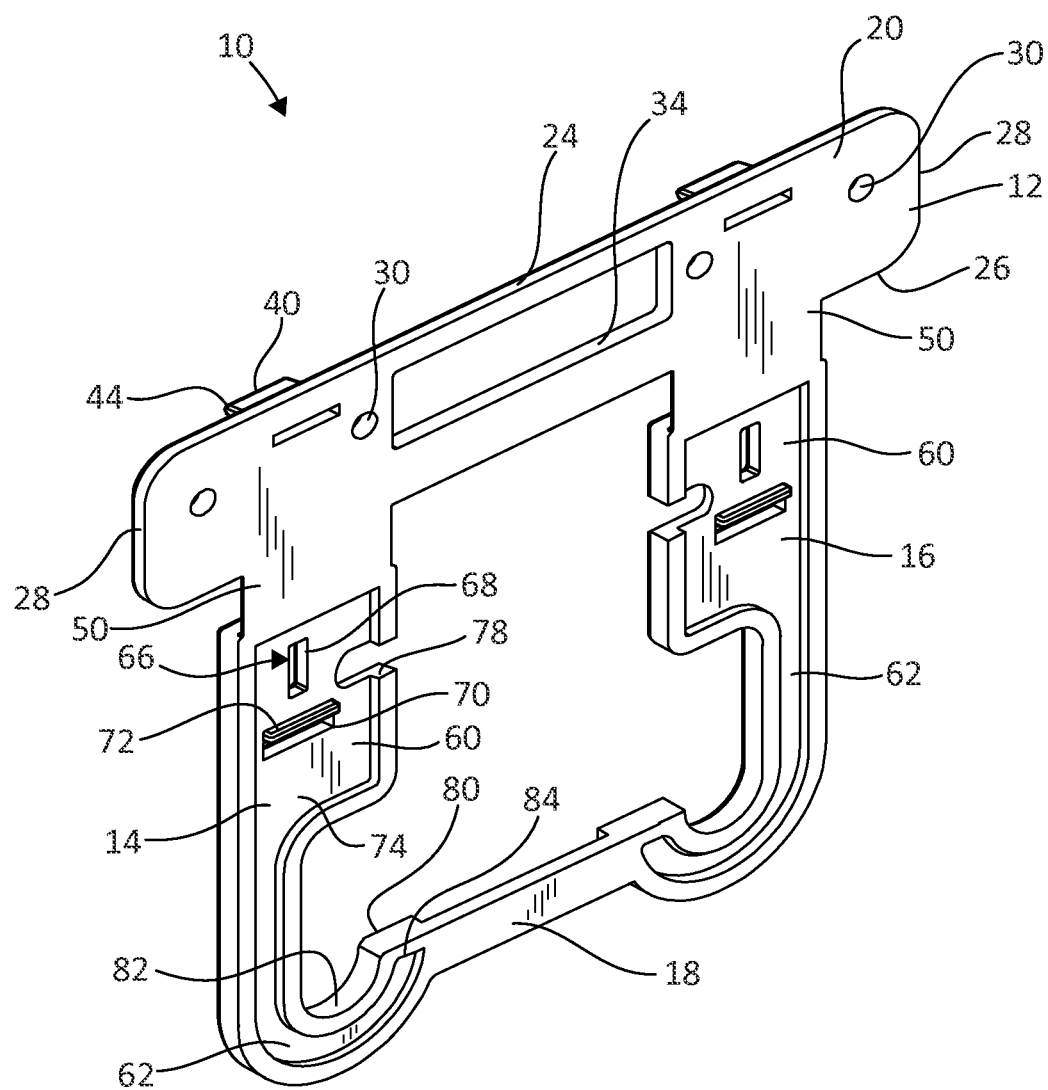
FIG. 1 is a front, perspective view illustration of a merchandise hanger, according to one embodiment of the present invention.
Figure 2:
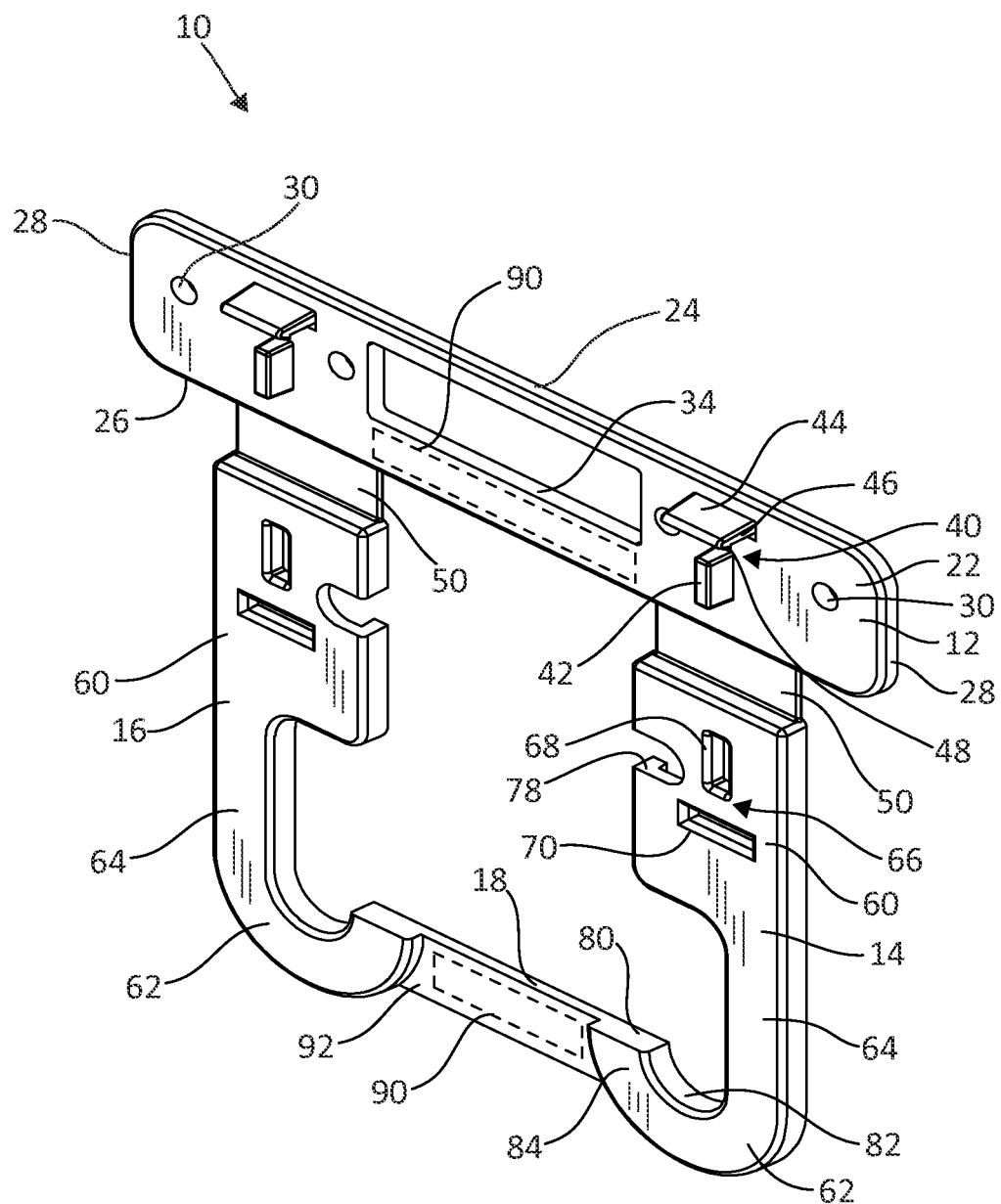
FIG. 2 is a rear, perspective view illustration of the merchandise hanger of FIG. 1, according to one embodiment of the present invention.

Merchandise hangers provide effective mechanisms for hanging products for retail sale from retail display support structures. In one embodiment, each merchandise hanger is configured to transition from a shipping position, in which the merchandise hanger is maintained within a footprint of a corresponding product or item of merchandise, and a display or hanging position, in which the merchandise hanger protrudes from a perimeter of the corresponding product to facilitate hanging the product from the support structure incorporated into the corresponding retail display. The transition of the merchandise hanger between positions allows the products with merchandise hangers to be provided in compact sizes and shapes for shipping and transportation while still providing an effective interface to support the products in a retail display. In one example, the merchandise hanger is formed or molded from a single material, such as plastic, etc. in a manner providing a cost effective, easy to use, and aesthetically pleasing hanger for the corresponding product.

Turning to the figures, FIGS. 1-7 illustrate a merchandise hanger 10 according to one embodiment of the present invention. Hanger 10 is configured to be secured to a product or merchandise assembly 100 (see FIGS. 8-10) including an item of merchandise or a product 104 (see FIGS. 8-10) such as a picture frame, picture, artwork, or other hanging home decor or similar item to provide a mechanism for hanging product assembly 100 from a support in a retail display setting. In one embodiment, hanger 10 includes an elongated plate or base section 12, a first extension member or first hooked section 14, a second extension member or second hooked section 16, and a cross bar 18.

Base section 12 is configured to be secured to merchandise assembly 100 including product 104 and/or any packaging thereon. In one embodiment, base section 12 defines a front surface 20 and a rear surface 22 opposite front surface 20 each extending between a top edge 24, a bottom edge 26 opposite top edge 24, and opposing side edges 28. At least front surface 20 and, in one embodiment, rear surface 22 are substantially planar. Each opposing side edge 28 extends between and, in one example, substantially perpendicular to top edge 24 and bottom edge 26.

Attachment apertures 30 extend through base section 12 between and through each of front surface 20 and rear surface 22. Each of attachment apertures 30 is sized to receive a screw, rivet, staple portion, or other fastener 32 (see FIGS. 8 and 9) to attach base section 12 to merchandise assembly 100. In one example, two or more, such as four, attachment apertures 30 are defined in a linear arrangement extending between opposing side edges 28. In one embodiment, base section 12 defines a middle opening 34 configured to accommodate various features of merchandise assembly 100 as will be further described below. In one example, middle opening 34 is substantially rectangular and is generally elongated as it extends between opposing side edges 28, for instance, centered between opposing side edges 28.

Figure 3:
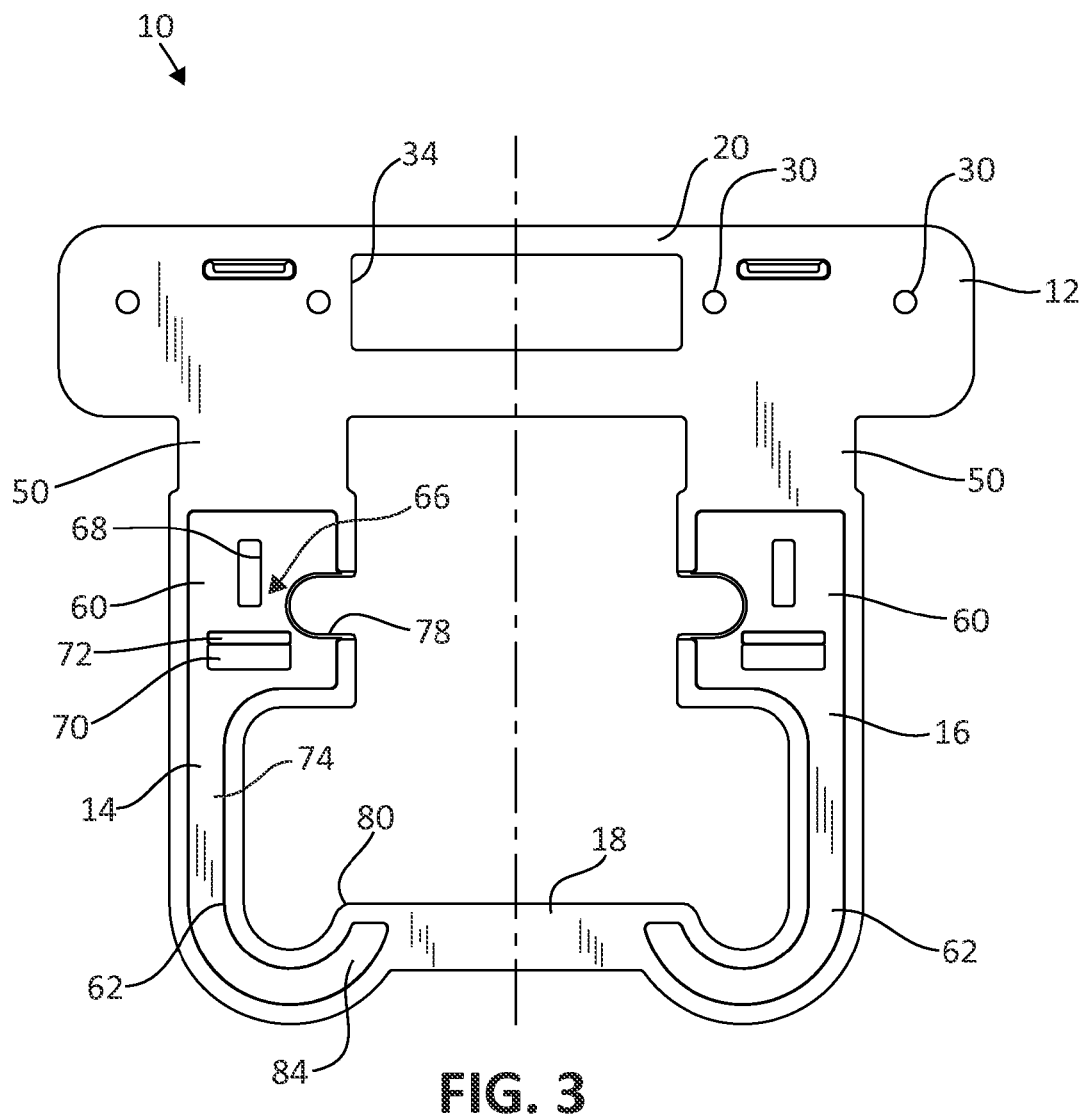
FIG. 3 is a front view illustration of the merchandise hanger of FIG. 1, according to one embodiment of the present invention.
Figure 4:
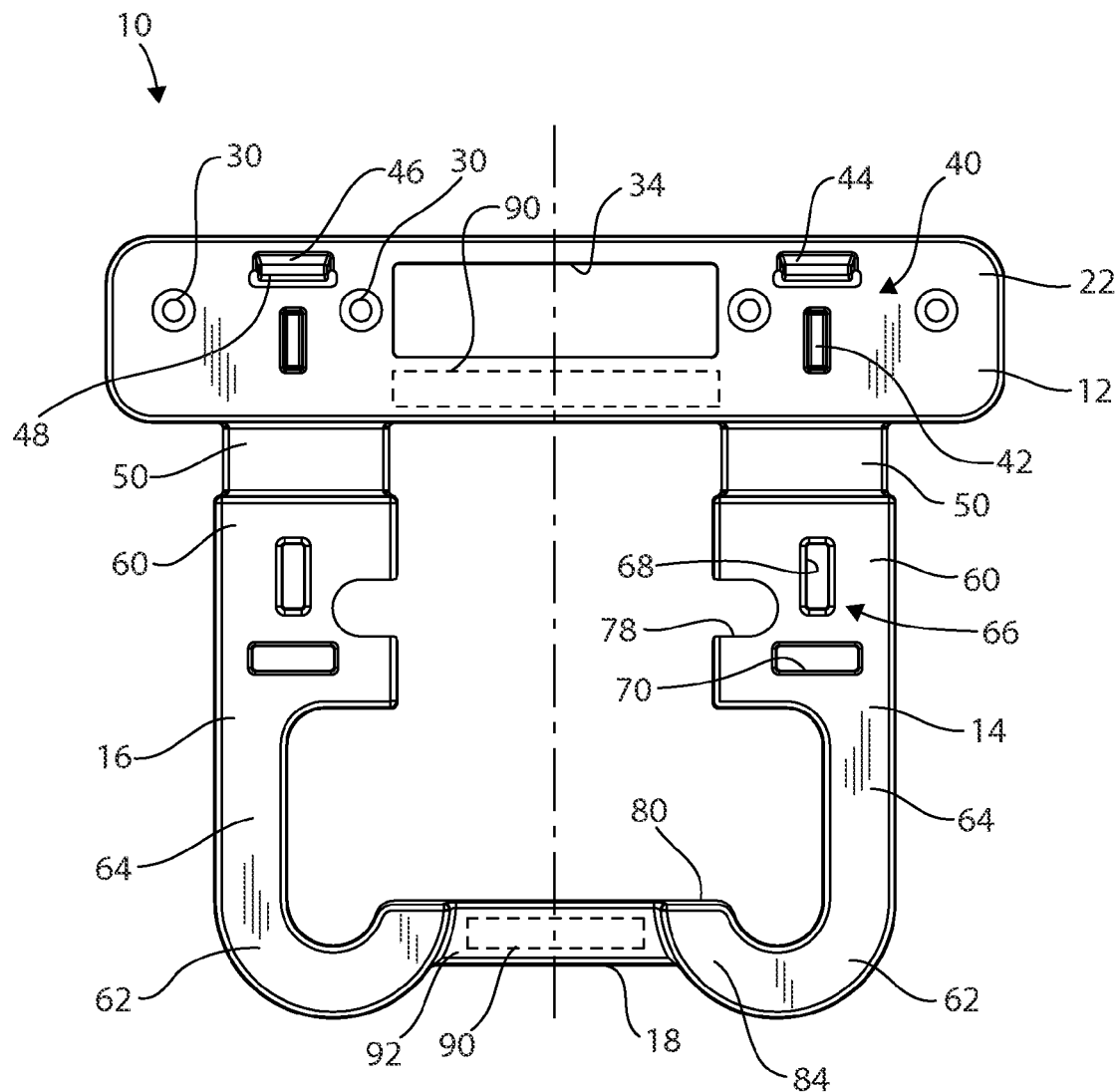
FIG. 4 is a rear view illustration of the merchandise hanger of FIG. 1, according to one embodiment of the present invention.
Figure 5:
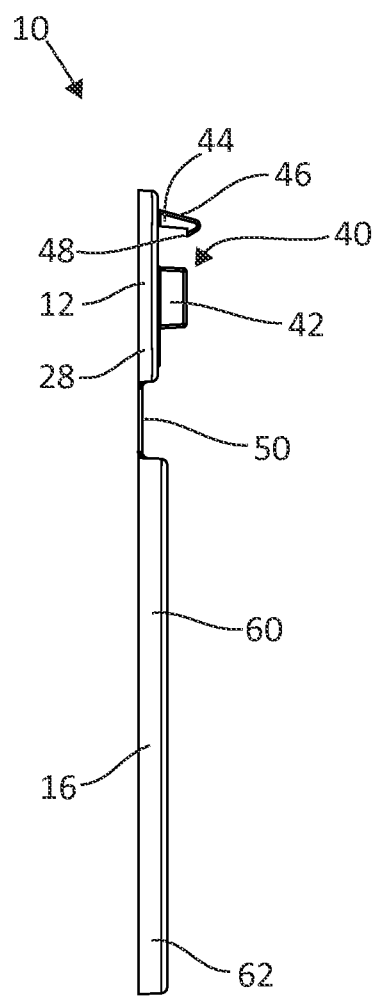
FIG. 5 is a right side view illustration of the merchandise hanger of FIG. 1, according to one embodiment of the present invention. The left side view illustration is a mirror image of the right side view illustration.
Figure 6:
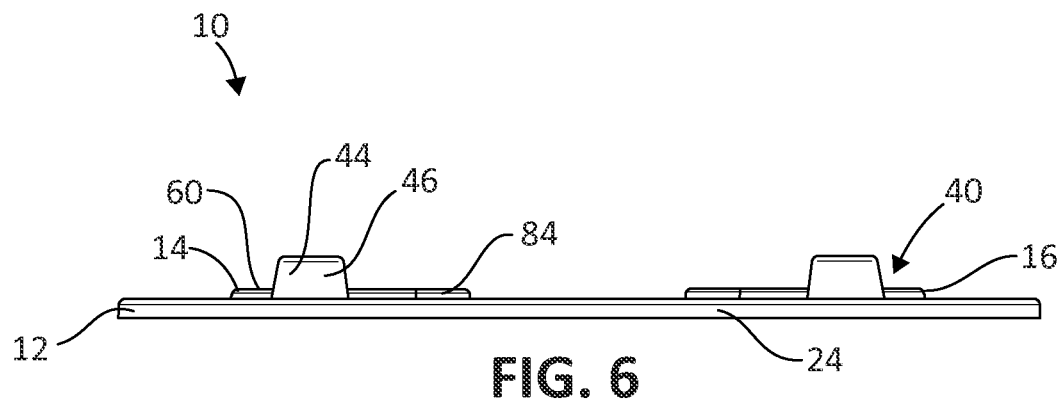
FIG. 6 is a top view illustration of the merchandise hanger of FIG. 1, according to one embodiment of the present invention.
Figure 7:
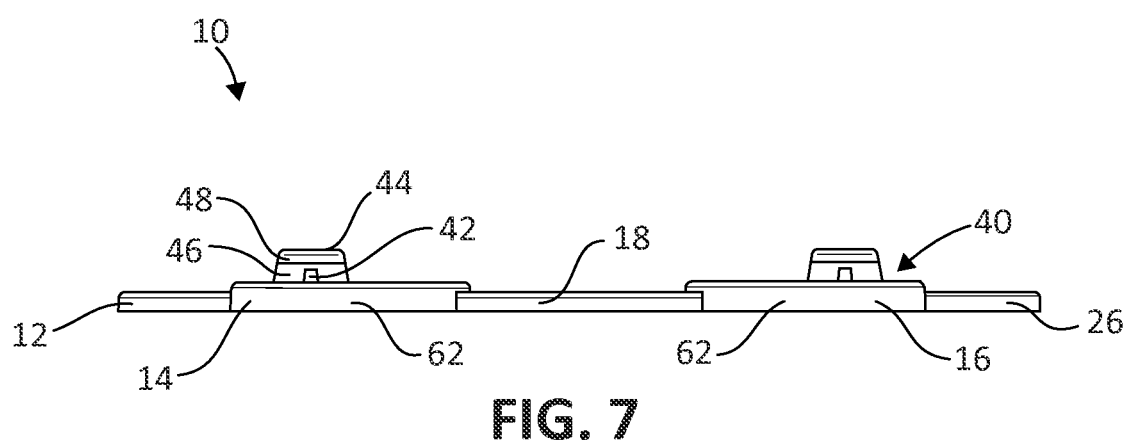
FIG. 7 is a bottom view illustration of the merchandise hanger of FIG. 1, according to one embodiment of the present invention.

In one embodiment, base section 12 includes at least one male coupling structure 40. Each of the at least one male coupling structure 40 is configured to interface with corresponding structures in other parts of hanger 10 to selectively maintain hanger 10 in a hanging or supporting position as will be described in further detail below. In one example, at least one male coupling structure 40 includes one or more of tabs 42 and/or one or more clips 44. In one embodiment, base section 12 includes a pair of tabs 42 and a pair of clips 44 with each pair being symmetrically positioned about a centerline of hanger 10, and in one embodiment, of base section 12, extending substantially parallel to opposing side edges 28 as illustrated in FIGS. 3 and 4. Each of tabs 42 protrudes from rear surface 22 in a direction extending away from front surface 20, which, in one embodiment, is an extension substantially perpendicular to rear surface 22. In one example, each of tabs 42 is generally rectangular or otherwise elongated and extends in a substantially vertical manner, which, in one embodiment, is substantially parallel to opposing side edges 28.

In one example, each of clips 44 extends from rear surface 22 in a direction extending away from front surface 20 and, in one embodiment, is substantially centered relative to one of tabs 42. As illustrated, in one embodiment, each of clips 44 includes a base portion 46 and a hook portion 48. Base portion 46 extends from rear surface 22 in a direction substantially perpendicular to rear surface 22, and, in one example, is substantially rectangular or otherwise elongated in a direction substantially parallel top edge 24 and bottom edge 26 of base section 12. Hook portion 48 extends from an end of base portion 46 opposite rear surface 22 and extends away substantially perpendicular to base portion 46 to effectively define hook portion 48 with a hook-like feature for grasping a corresponding feature of hanger 10 as will be further described below. In one example, hook portion 48 extends downwardly from base portion 46.

First hooked section 14 and second hooked section 16 each extend downwardly from and are coupled with bottom edge 26 of base section 12 via a living hinge 50. In one embodiment, where hanger 10 is entirely formed of a single material such as a molded plastic or similar material, living hinge 50 is a portion of hanger 10 with a relatively thin thickness to allow a bottom portion of hanger 10 including first hooked section 14, second hooked section 16, and cross bar 18 to be bent, flipped, or folded along living hinge 50. In one embodiment, living hinge 50 is configured to allow first hooked section and second hooked section 16 to each be folded upwardly relative to base section 12 to interface with at least one male coupling structure 40, e.g., tabs 42 and/or clips 44, of base section 12 while maintaining hanger 10 as a single molded piece of suitable material.

In one embodiment, first hooked section 14 includes a primary body 60 and a hooked or curved extension or curved portion 62 extending from primary body 60. Primary body 60 extends from and, in one embodiment, directly abuts living hinge 50. In one example, primary body 60 is substantially rectangular. Primary body 60 and hooked section 14 collectively define a substantially planar rear surface 64 of the bottom portion of hanger 10. First hooked section 14 includes at least one female coupling structure 66 extending rearwardly from rear surface 64, for example, entirely through first hooked section 14 to selectively mate with at least one male coupling structure 40 of base section 12 when hanger 10 is in the hanging position (see FIG. 9). In one example, the at least one female coupling structure 66 includes a guide slot or aperture 68 for receiving one of tabs 42 and a guide slot or aperture 70 for receiving one of clips 44. Aperture 68 is substantially rectangular or otherwise shaped in a manner corresponding with a shape of a corresponding one of tabs 42 to receive the corresponding tab 42 when hanger 10 is in the folded or hanging position. In one example, interaction between aperture 68 and the one of tabs 42 acts to guide positioning of hooked section 14 relative to base section 12 when hanger 10 is being folded.

Aperture 70 is sized, shaped, and positioned to receive a corresponding one of clips 44 of base section 12. In one example, a protrusion 72 extends forwardly from one side edge of aperture 70, for instance, from a top edge of aperture 70 to interface with hooked portion 48 of the corresponding clip 44 as will be described in further detail below. In one embodiment, hooked portion 48 defines a front recess 74, and protrusion 72 is defined and protrudes from front recess 74. In one example, a side slot or groove 78 extends from an internal edge of hooked portion 48 into front recess 74. Groove 78 provides clearance around one of fasteners 32 (see FIG. 9) when hanger 10 is in the folded position.

Curved portion 62 of first hooked section 14 extends downwardly from primary body 60, and hooked section 14 curves or hooks near an opposite end thereof to form a hook with an opening 80 facing a center of hanger 10 (i.e., facing second hooked section 16). Hooked portion 48 defines a support surface 82 on a top edge of the hook configured to interface with a supporting structure of a retail display as will be further described below.

In one embodiment, second hooked section 16 is substantially similar to first hooked section 14 described above except where specifically noted. In one example, first hooked section 14 and second hooked section 16 are symmetrically positioned and orientated relative to a vertical centerline (see FIGS. 3 and 4). For example, hooked portions 48 of each of first hooked section 14 and second hooked section 16 are open toward each other, that is, open toward a center of hanger 10. In one example, hooked portions 48 of first hooked section 14 and second hooked section 16 face in the same direction (e.g., left or right), are each opened away from one another, or take on any other suitable orientation. In one example, cross bar 18 extends from and between first hooked section 14 and second hooked section 16 in a manner providing additional strength and rigidity to hanger 10. As illustrated, in one embodiment, cross bar 18 extends between and directly abuts terminal ends 84 of each hook portion 48 of first hooked section 14 and second hooked section 16. Other locations for cross bar 18 to extend between first hooked section 14 and second hooked section 16 are also contemplated such as between base portions 46 of first hooked section 14 and second hooked section 16 as will be apparent to those of skill in the art upon reading the current application.

In one example, portions of hanger 10 are configured to receive indicia 90 such as marketing, instructional, branding, or other suitable indicia. In one example, indicia 90 include instructions for using hanger 10 such as "flip up and snap." In one embodiment, cross bar 18 defines a rear or display surface 92 for supporting indicia 90 as generally indicated as a dashed line box in FIGS. 2, 4, and 8. In one example, rear surface 22 of base section 12 is also configured to and may support indicia 90, for instance, just below mid-opening 34 as illustrated in FIGS. 2, 4, 8, and 9.

Hanger 10 is sized in any suitable manner and, in one example, is sized based on the size and weight of merchandise assembly 100 that hanger 10 is expected to support. In one embodiment, hanger 10 has an overall width, e.g., a width of base section 12, between about 4.5 inches and about 5 inches (e.g., 4.8 inches) and an overall height between about 3.5 inches and about 4 inches. In one example, base section 12 has a height of about 1 inch, middle opening 34 has a height of about 0.5 inch. In one embodiment, living hinge 50 defines a height between base section 12 and the corresponding one of first hooked section 14 and second hooked section 16 of at least about 0.25 inch.

Figure 8:
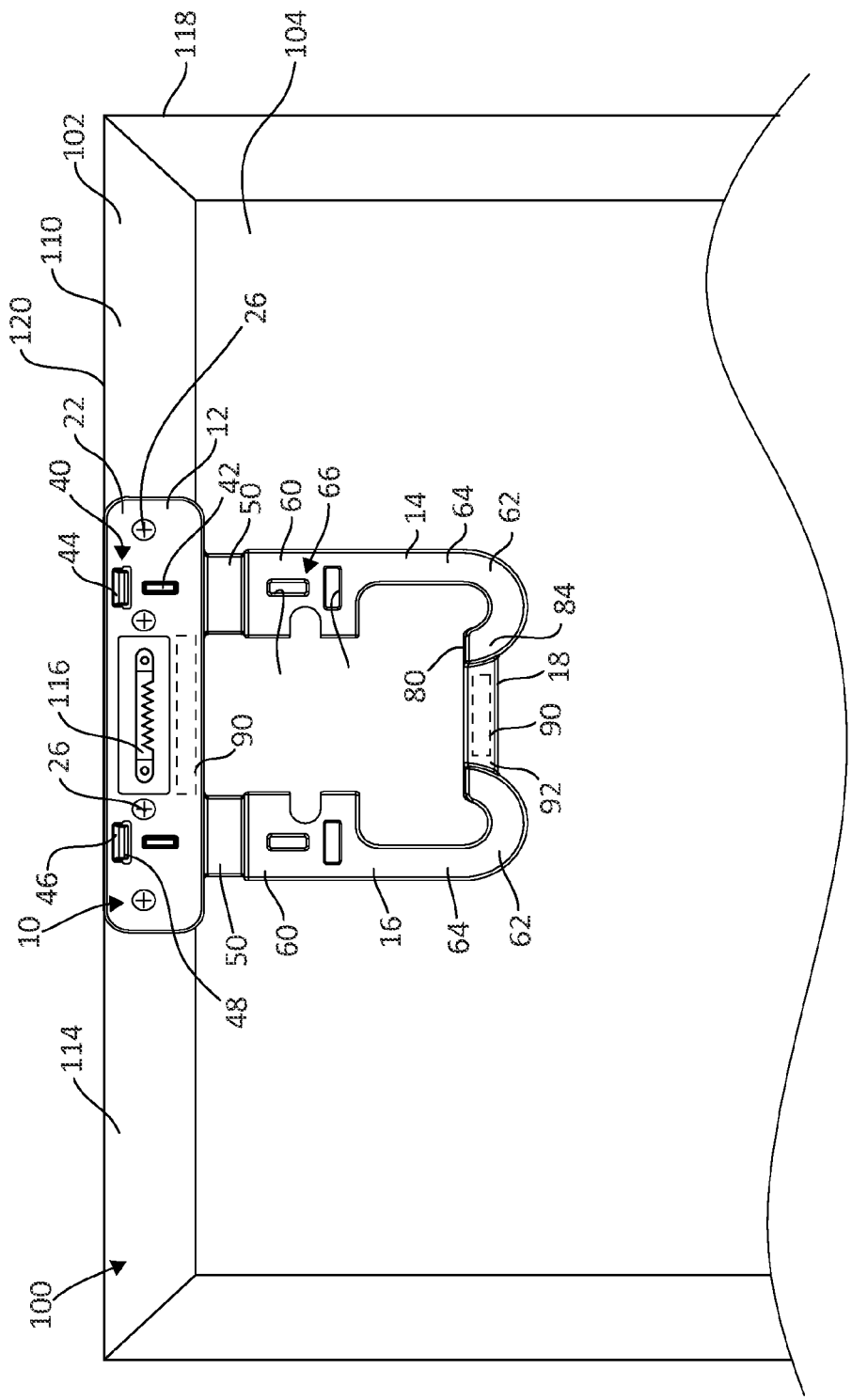
FIG. 8 is a rear view illustration of the merchandise hanger of FIG. 1 in a shipping position and coupled to a product for retail sale, according to one embodiment of the present invention.
Figure 9:
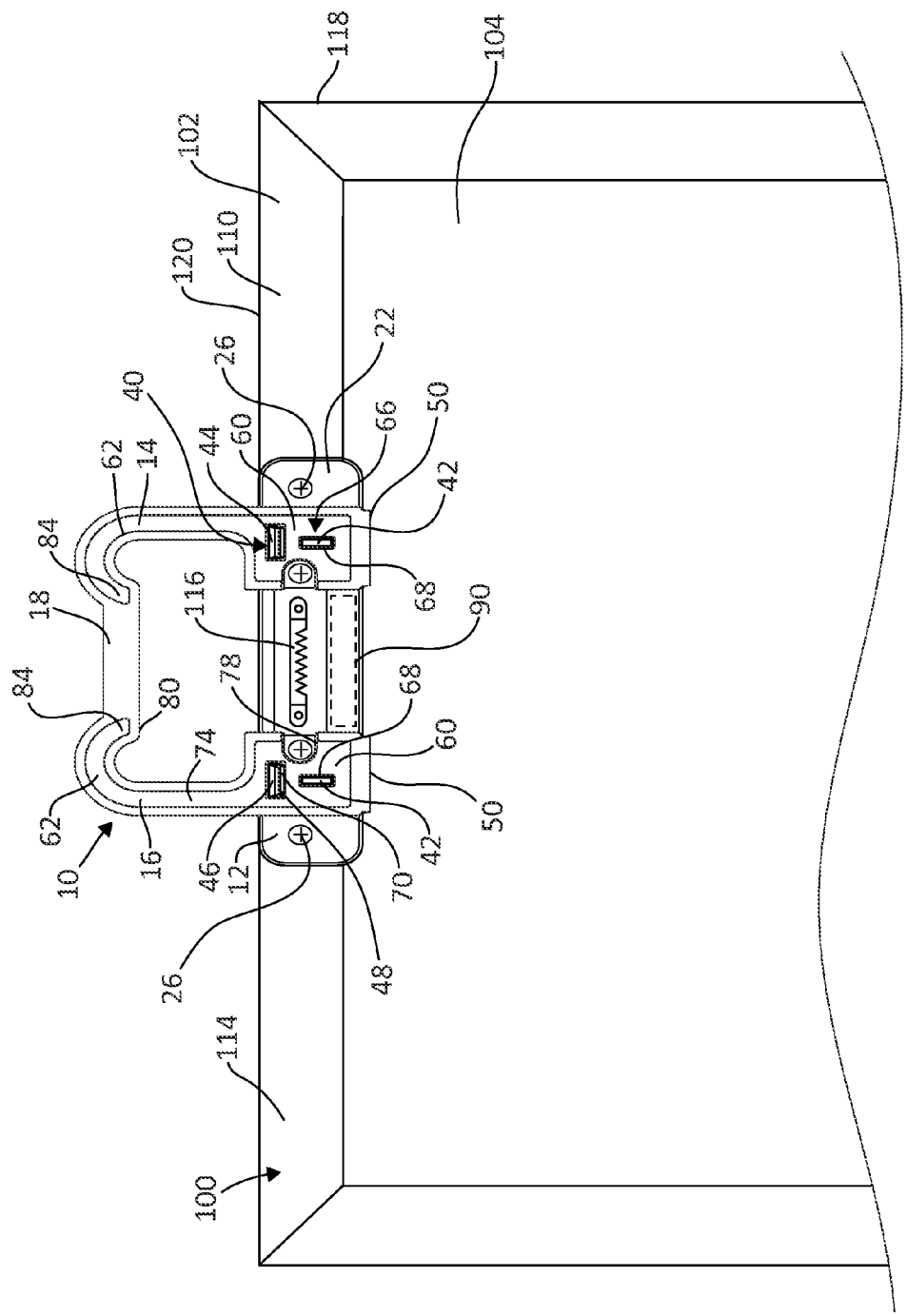
FIG. 9 is a rear view illustration of the merchandise hanger of FIG. 1 in a hanging position and coupled to a product for retail sale, according to one embodiment of the present invention.

FIGS. 8 and 9 illustrate hanger 10 coupled to a merchandise assembly 100 according to one embodiment of the invention. Merchandise assembly 100 includes merchandise item or product 104 such as a picture frame, picture, artwork, or other hanging home decor. In one example, merchandise assembly 100 also includes packaging of some sort such as plastic wrap, cardboard or plastic frame-like box, etc. Upon reading this application, one of skill in the art will recognize that hanger 10 may be applied directly to product 104 or to any relatively rigid or otherwise suitable packaging coupled to product 104. In the illustrated embodiments, merchandise assembly 100 includes a frame 102 surround a picture, photo, or similar product 104 or packaging associated therewith. Frame 102 may be a decorative frame meant to be hung and displayed with product 104 by an end user or a cardboard or similar packaging frame surrounding at least a portion of product 104 and meant to be discarded by the end user.

In one embodiment, frame 102 defines frame wall 110 with a front surface 112 and a rear surface 114 opposite the front surface 112. In one example, front surface 112 and rear surface 114 can be considered the front and rear surfaces, respectively, of merchandise assembly 100 as a whole. Front surface 112 faces in a direction similar to the direction a viewable surface 115 (see FIG. 10) of product 104 faces. In one example, a saw-tooth or other suitable hanger 108 is coupled to rear surface 114 to facilitate hanging frame 102 in the home, office, or other desired location by the end user. In one embodiment, other items such as a security band or device are attached in the place of saw-tooth hanger 108. Merchandise assembly 100, for example, frame 102, defines an outermost perimeter 118, which, in turn, defines an overall footprint of merchandise assembly 100.

Front surface 20 (see FIGS. 1 and 3) of hanger 10 is applied to rear surface 114 of frame wall 110, for example, centered between opposing sides of frame wall 110. In one embodiment, hanger 10 is applied such that top edge 24 (e.g., a topmost edge) of hanger 10 does not extend above a topmost edge 120 of merchandise assembly 100, which, in one example, is defined by frame 102. In one example, hanger 10 is positioned such that saw-tooth hanger 108 is received within middle opening 34 such that saw-tooth hanger 108 does not obstruct the substantially face-to-face mating of front surface 20 of hanger 10 and rear surface 114 of frame wall 110. Fasteners 32, such as screws, nails, rivets, staples, etc., are inserted through attachment apertures 30 of base section 12 of hanger 10 to secure hanger 10 to merchandise assembly 100.

Once attached and while unfolded as illustrated in FIG. 8, hanger 10 generally fits within the outer footprint of merchandise assembly 100 defined by outermost perimeter 118 of merchandise assembly 100. As such, hanger 10 generally does not substantially add to the outer dimensions of merchandise assembly 100, which permits for easier packing and storage of multiple product assemblies 100 in a box or other arrangement for storage and transportation. In one example, since hanger 10 does not substantially increase the dimensions of the footprint of merchandise assembly 100 cost savings are realized when packing and storing product assemblies 100. While primarily described as being attached to frame 102, upon reading the application, one of skill in the art will recognize that hanger 10 can be attached to any suitable portion of merchandise assembly 100 including direct attachment to product 104.

When merchandise assembly 100 is being unpacked and hung in a retail setting, the employee or other individual hanging product assembly transitions hanger 10 between the folded or storage position shown in FIG. 8 and the unfolded or hanging position shown in FIG. 9. More specifically, the employee grasps one or more of first hooked section 14, second hooked section 16, and cross bar 18 to fold the bottom portion of hanger 10 about a horizontal axis through living hinges 50. As the bottom portion of hanger 10, which includes first hooked section 14, second hooked section 16, and cross bar 18, is folded upwardly, tabs 42 of base section 12 are received within apertures 68 of first hooked section 14 and second hooked section 16 to guide alignment of the bottom portion of hanger 10 with base section 12.

Continued folding of hanger 10 moves clips 44 of base section 12 through apertures 70 of first hooked section 14 and second hooked section 16 until hook portion 48 of each clip 44 moves over and then hooks around protrusions 72 extending adjacent each of apertures 70 in a manner effectively locking the bottom portion of hanger 10 in an inverted position. More specifically, when locked in the hanging position with the bottom portion of hanger 10 inverted, rear surface 22 of base section 12 directly abuts or is directly adjacent to rear surface 64 of each primary body 60 and curved portion 62 of first hooked section 14 and second hooked section 16. In one embodiment, when hanger 10 is in the hanging position, base section 12 of hanger 10 is substantially hidden from view of a potential consumer viewing merchandise assembly 100 from a front vantage point as shown, for example, with additional reference to FIG. 10. Although hanger 10 is primarily described herein as including at least one male coupling structure 40 on base section 12 and at least one female coupling structure 66 on the bottom portion, more particularly, on first hooked section 14 and second hooked section 16, upon reading this application, one of skill in the art will recognize that the position of at least one male coupling structure 40 and at least one female coupling structure 66 can be interchanged and still collectively provide for guidance and locking of hanger 10 during transition to and/or in the hanging position.

In the hanging position of FIG. 9, curved portions 62 of each of first hooked section 14 and second hooked section 16 extend above topmost edge 120 of merchandise assembly 100. In one example, cross bar 18 also is positioned above topmost edge 120 of merchandise assembly 100 when hanger 10 is in the hanging position, and indicia 90 on display surface 92 face forwardly to be viewable by potential consumers viewing merchandise assemblies 100 on retail display. In one embodiment, hanger 10 extends above topmost edge 120 of merchandise assembly 100 when hanger 10 is in the hanging position a distance between about 1.5 inches and about 2 inches, for example, about 1.8 inches.

Figure 10:
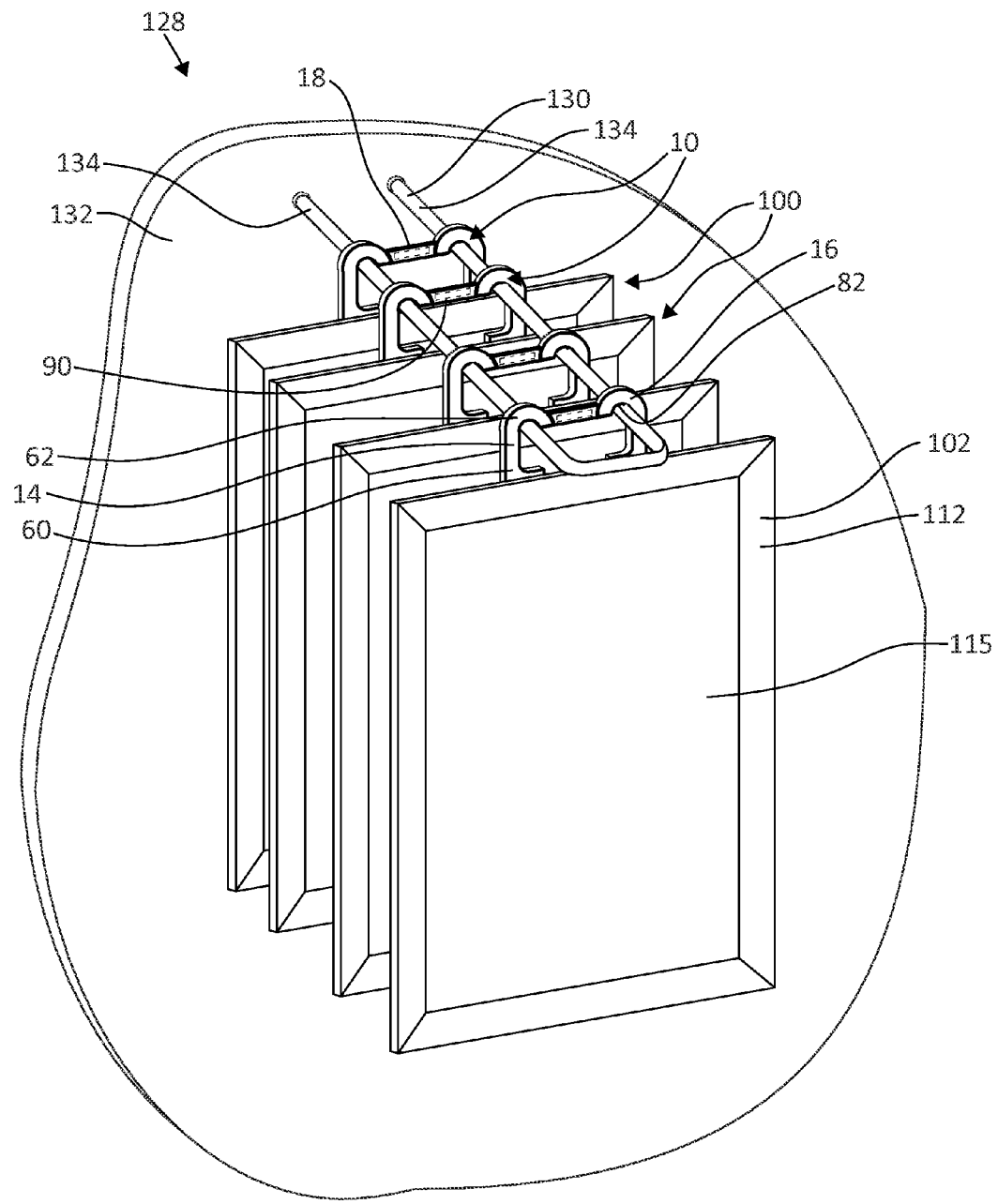
FIG. 10 is a front, perspective view illustration of a retail display including a plurality of merchandise hangers each coupled with a product for retail sale and hung from a support structure, according to one embodiment of the present invention.

One example of a retail display 128 is illustrated in FIG. 10 and includes a support structure 130 extending from a display wall 132. In one embodiment, support structure 130 is a U-shaped or other structure including two parallel bars 134. Merchandise assembly 100 is hung from support structure 130 by placing each support surface 83 of each curved portion 62 of first hooked section 14 and second hooked section 16 on a different corresponding one of the two parallel bars 134. Hanger 10 coupled with merchandise assembly 100 can be readily slid along support structure 130 and multiple hangers 10 each coupled with a different merchandise assembly 100 can be supported by a single support structure 130. In this manner, merchandise assembly 100 is readily viewable by potential consumers in a neat, orderly, and aesthetically pleasing manner without requiring a lower support or shelf for merchandise assembly 100.

Figure 11:
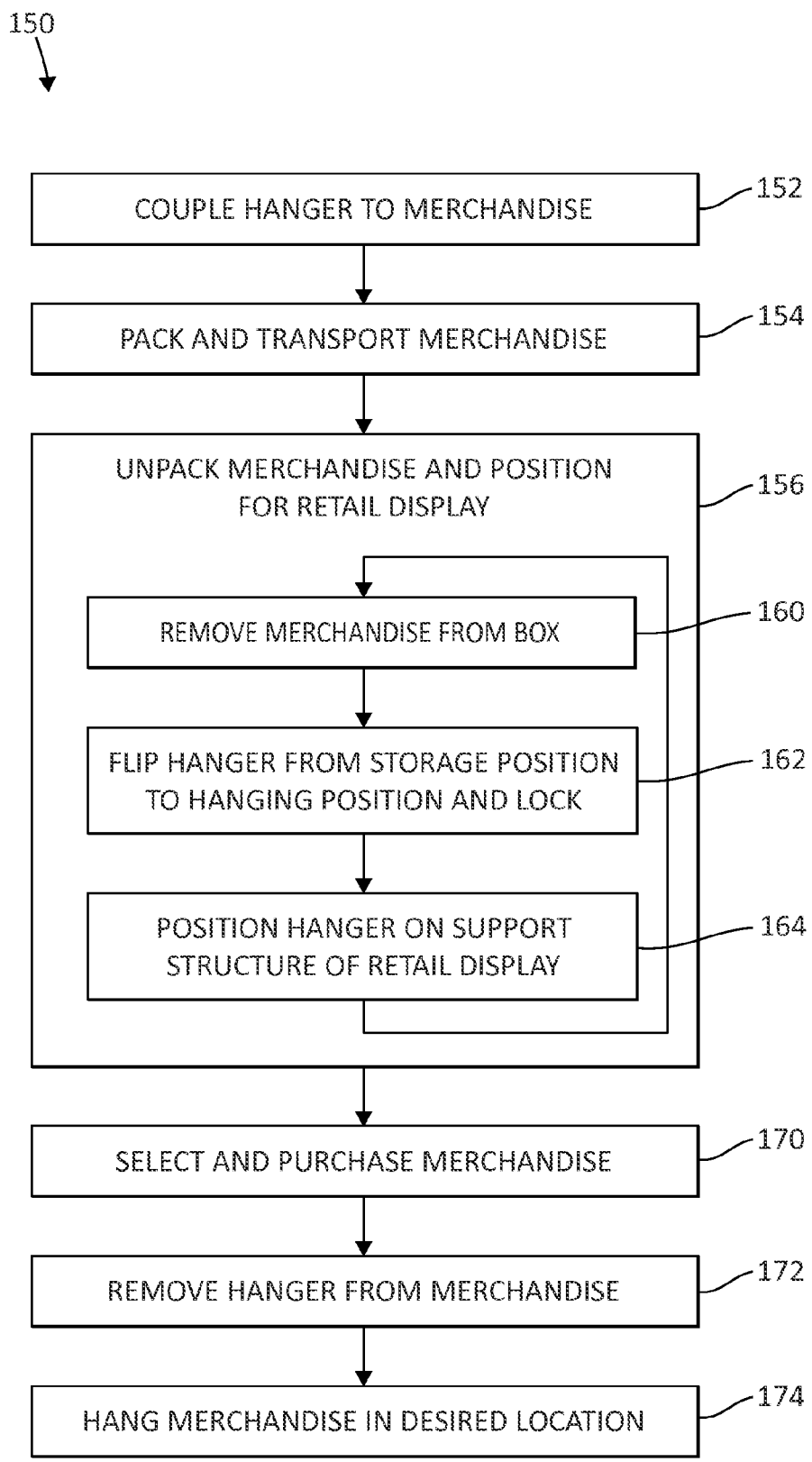
FIG. 11 is a flow chart illustrating a method of using a merchandise hanger, according to one embodiment of the present invention.

One example of a method of using hanger 10 to support a merchandise assembly 100 is generally illustrated at 150 in FIG. 11. Method 150 begins by coupling hanger 10 to merchandise assembly 100. For example, as described above, front surface 20 of base section 12 of hanger 10 is laid over rear surface 114 of frame wall 110 (or similar portion of product 104 directly) and fasteners 32 are placed through attachment apertures 30 of hanger 10 and into frame wall 110. At 154, merchandise assembly 100 with hanger 10 are packed and transported. In one example, hanger 10 is in an unfolded or storage position (FIG. 8) and fully disposed within the footprint or outermost perimeter 118 of merchandise assembly 100 when packed, for instance, in a box or other suitable container. In one embodiment, multiple merchandise assemblies 100 each having a corresponding hanger 10 are packed in a single box or other container for transport.

At 156, the box or other container of merchandise assemblies 100 is received at a retail setting. Merchandise assemblies 100 are unpacked from the box or container and positioned for retail display by a person such as an employee, contractor, etc. More specifically, in one example, unpacking and positioning at 156 includes removing each merchandise assembly 100 from the box or container at 160 and flipping the corresponding hanger 10 of each merchandise assembly 100 from the storage position (FIG. 8) to the hanging position (FIG. 9) at 162. In one embodiment, flipping or folding the hanger at 162 includes locking hanger 10 in the hanging position, for example, by mating at least one male coupling structure 40 of base section 12 with at least one female coupling structure 66 of first hooked section 14 and second hooked section 16. In one example, when hanger 10 is in the folded position, the at least one male coupling structure 70 extends through at least one female coupling structure 66 and front recess 74 receives at least one male coupling structure 70 of base section 12 in a manner maintaining at least one male coupling structure 70 (e.g., tab 42 and/or clip 44) inset from the rearmost planar surface of each of first hooked section 14 and second hooked section 16.

Once in hanging position following operation 162, hanger 10 is slid over support structure 130 such that merchandise assembly 100 is hung from support structure 130 via the corresponding hanger 130. Steps 160, 162, and 164 are repeated as necessary until support structure 130 is filled with merchandise assemblies 100 and/or until all merchandise assemblies 100 are removed from the box or container they were shipped in.

Following operation 156, merchandise assemblies 100 are fully positioned for retail display and sale. In one embodiment, indicia 90 on flat, display surface 92 of cross bar 18 are visible by potential consumers viewing merchandise assemblies 100 from a front vantage point. In one example, when on retail display, base section 12 and portions or all of base portions 46 of first hooked section 12 and second hooked section 14 are entirely or at least substantially hidden by merchandise assemblies 100 from a potential consumer's view.

At 170, potential consumers select and purchase at least one of merchandise assemblies 100. After transporting the at least one selected merchandise assembly 100 from retail display 128 and the retail setting as a whole, then at 172, the consumer removes hanger 10 from the corresponding merchandise assembly 100 by removing fasteners 32. Any packaging included as part of merchandise assembly 100 is also removed. In one embodiment, product 104 is configured to be hung for end use without removing hanger 10, in which case, operation 172 may be eliminated. At 174, the consumer hangs product 104 in the desired location using provided saw-tooth hanger 116, other hanging mechanism provided with product 104, and/or with consumer provided hanging mechanisms. Once hung, the consumer can enjoy the aesthetic or other nature of product 104.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A merchandise hanger for displaying a product assembly, the merchandise hanger comprising:
   a base section defining a first edge, a second edge opposite the first edge, a front side, and a rear side opposite the front side, the base section including features configured to facilitate coupling the base section to a back of the product assembly such that the front side of the base section abuts the back of the product assembly;
   a living hinge extending from the second edge of the base section; and
   a hooked section extending from the living hinge in a direction opposite the base section;
   wherein:
      the base section includes one of at least one male coupling structure and at least one female coupling structure,
      the hooked section includes the other of the at least one male coupling structure and the at least one female coupling structure,
      the merchandise hanger is configured to fold about the living hinge in a manner mating the at least one male coupling structure and the at least one female coupling structure to maintain the merchandise hanger in a folded position,
      the living hinge is a first living hinge,
      the hooked section is a first hooked section, and
      the merchandise hanger further comprises:
         a second living hinge spaced from the first living hinge and extending from the second edge of the base section, and a second hooked section extending from the second living hinge in the direction opposite the base section.

2. The merchandise hanger of claim 1, wherein:
the base section defines opposing side edges and a centerline centered between the opposing side edges, and
the first hooked section and the second hooked section are spaced from one another and positioned symmetrically about the centerline of the base section.

3. The merchandise hanger of claim 2, wherein:
the first hooked section defines a first end hook, the first end hook being positioned opposite the first living hinge and defining a first opening,
the second hooked section defines a second end hook, the second end hook being positioned opposite the second living hinge and defining a second opening,
the first opening faces the second end hook, and
the second opening faces the first end hook.

4. The merchandise hanger of claim 1, further comprising:
a cross bar extending between the first hooked section and the second hooked section, wherein the cross bar is spaced from the base section.

5. The merchandise hanger of claim 4, wherein:
each of the first end hook and the second end hook define one of two terminal ends, and the cross bar extends from one of the two terminal ends to another of the two terminal ends.

6. A combination comprising:
a product assembly for retail sale defining a back and a topmost edge of the product assembly; and
a merchandise hanger comprising:
a base section defining a first edge, a second edge opposite the first edge, a front side and a rear side opposite the front side the base section including features configured to facilitate coupling the base section to the back of the product assembly such that the front side of the base section abuts the back of the product assembly;
a living hinge extending from the second edge of the base section; and
a hooked section extending from the living hinge in a direction opposite the base section;
wherein:
the base section includes one of at least one male coupling structure and at least one female coupling structure,
the hooked section includes the other of the at least one male coupling structure and the at least one female coupling structure, and
the merchandise hanger is configured to fold about the living hinge between an unfolded position and the folded position in a manner mating the at least one male coupling structure and the at least one female coupling structure to maintain the merchandise hanger in a folded position,
the base section is attached to the back of the product assembly below the topmost edge of the product assembly,
the merchandise hanger is configured to fold about the living hinge between the unfolded position and the folded position while the base section is attached to the back of the product assembly,
when the merchandise hanger is in one of the folded position and the unfolded position, the hooked section is positioned substantially entirely below the topmost edge of the product assembly, and
when the merchandise hanger is in the other of the folded position and the unfolded position, the hooked section is positioned at least partially above the topmost edge of the product assembly.

7. The merchandise hanger of claim 6, wherein the merchandise hanger is formed as a single, molded piece of material.

8. The merchandise hanger of claim 6, wherein:
when the merchandise hanger is in the unfolded position, the hooked section is substantially entirely maintained on a first side of the second edge of the base section,
the first side is defined opposite the first edge, and
when the merchandise hanger is in the folded position, the hooked section at least partially extends beyond the first edge of the base section opposite the second edge of the base section.

9. The combination of claim 6, wherein the product assembly includes a frame defining a rear surface, and the front side of base section faces and is coupled to the rear surface of the frame.

10. The merchandise hanger of claim 6, wherein the base section defines opposing side edges and an elongated middle opening centered between the opposing side edges of the base section.

11. The merchandise hanger of claim 6, wherein:
the base section includes the at least one male coupling structure,
the at least one male coupling structure includes a hooked clip,
the hooked portion includes the at least one female coupling structure,
the at least one female coupling structure includes an aperture with a protrusion extending from one side of the aperture, and
when the merchandise hanger is in the folded position, the hooked clip extends through the aperture and grasps the protrusion to lock the merchandise hanger in the folded position.

12. A merchandise hanger for displaying a product assembly, the merchandise hanger comprising:
a base section defining a first edge, a second edge opposite the first edge, a front side, and a rear side opposite the front side the base section including features configured to facilitate coupling the base section to a back of the product assembly such that the front side of the base section abuts the back of the product assembly;
a living hinge extending from the second edge of the base section; and
a hooked section extending from the living hinge in a direction opposite the base section;
wherein:
the base section includes one of at least one male coupling structure and at least one female coupling structure,
the hooked section includes the other of the at least one male coupling structure and the at least one female coupling structure,
the merchandise hanger is configured to fold about the living hinge in a manner mating the at least one male coupling structure and the at least one female coupling structure to maintain the merchandise hanger in a folded position, and
the features configured to facilitate coupling the base section to the back of the product assembly include a linear arrangement of apertures extending through the base section and each being configured to receive a different fastener extending into the product assembly.

13. A merchandise hanger for displaying a product assembly, the merchandise hanger comprising:
   a base section defining a first edge, a second edge opposite the first edge, a front side, and a rear side opposite the front side the base section including features configured to facilitate coupling the base section to a back of the product assembly such that the front side of the base section abuts the back of the product assembly;
   a living hinge extending from the second edge of the base section; and
   a hooked section extending from the living hinge in a direction opposite the base section;
   wherein:
      the base section includes one of at least one male coupling structure and at least one female coupling structure,
      the hooked section includes the other of the at least one male coupling structure and the at least one female coupling structure,
      the merchandise hanger is configured to fold about the living hinge in a manner mating the at least one male coupling structure and the at least one female coupling structure to maintain the merchandise hanger in a folded position,
      the fastener extends through the features of the base section and facilitates coupling the base section to the back of the product assembly, and
      the hooked portion includes an opening extending therethrough to accommodate a portion of the fastener extending rearwardly from the rear surface of the base section.

14. A retail display assembly comprising:
   a product assembly for retail sale defining a front display surface, a rear surface opposite the front display surface, and a footprint; and
   a hanger comprising:
      a base section defining a first edge, a second edge opposite the first edge, a front surface coupled to the rear surface of the product assembly, and a rear surface opposite the front surface, the base section including features configured to facilitate coupling the base section to the rear surface of the product assembly such that the front surface of the base section abuts the rear surface of the product assembly,
      a living hinge extending from the second edge of the base section, and
      an extension member extending from the living hinge in a direction opposite the base section, the extension member defining a support surface for interacting with a support in a retail display to hang the product from the support,
   wherein:
      the hanger is configured to transition from an unfolded position to a folded position in which the extension member is rotated about the living hinge,
      the base section includes one of at least one male coupling structure and at least one female coupling structure,
      the extension member includes the other of the at least one male coupling structure and the at least one female coupling structure,
      when the hanger is in the folded position, the at least one male coupling structure and the at least one female coupling structure mate to maintain the hanger in the folded position,
      when the hanger is in one of the folded position and the unfolded position, the extension member is maintained entirely within the footprint of the product assembly, and
      when the hanger is in the other of the folded position and the unfolded position, the extension member extends at least partially outside the footprint of the product assembly.

* * * * *